(12) United States Patent
Liao et al.

(10) Patent No.: US 9,285,923 B2
(45) Date of Patent: Mar. 15, 2016

(54) TOUCH SENSITIVE DISPLAY SYSTEM

(71) Applicant: Sharp Laboratories of America, Inc., Camas, WA (US)

(72) Inventors: Miao Liao, Camas, WA (US); Ahmet Mufit Ferman, Vancouver, WA (US); Xiaofan Feng, Camas, WA (US); Philip B. Cowan, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 204 days.

(21) Appl. No.: 13/720,446

(22) Filed: Dec. 19, 2012

(65) Prior Publication Data

US 2014/0168162 A1 Jun. 19, 2014

(51) Int. Cl.
| | |
|---|---|
| *G06F 3/042* | (2006.01) |
| *G06F 3/03* | (2006.01) |
| *G06F 3/041* | (2006.01) |

(52) U.S. Cl.
CPC .............. *G06F 3/042* (2013.01); *G06F 3/0325* (2013.01); *G06F 3/0416* (2013.01); *G06F 3/0418* (2013.01); *G06F 3/0428* (2013.01)

(58) Field of Classification Search
USPC ................................................ 345/173–179
See application file for complete search history.

(56) References Cited

U.S. PATENT DOCUMENTS

| | | | |
|---|---|---|---|
| 8,022,941 B2 | 9/2011 | Smoot | |
| 8,218,154 B2 | 7/2012 | Ostergaard et al. | |
| 8,259,240 B2 | 9/2012 | Han | |
| 2009/0128508 A1* | 5/2009 | Sohn et al. | 345/173 |
| 2011/0122075 A1* | 5/2011 | Seo et al. | 345/173 |
| 2011/0221701 A1 | 9/2011 | Zhang et al. | |
| 2012/0153134 A1 | 6/2012 | Bergstrom et al. | |
| 2013/0082980 A1* | 4/2013 | Gruhlke et al. | 345/175 |

* cited by examiner

*Primary Examiner* — Waseem Moorad
*Assistant Examiner* — Michael Faragalla
(74) *Attorney, Agent, or Firm* — Chernoff Vilhauer McClung & Stenzel, LLP

(57) ABSTRACT

A display includes a display area that emits light and a border region surrounding at least a portion of the light emitting region. A light guide plate is overlaying the display area. A lighting module is operatively interconnected with the light guide plate to provide light to the light guide plate and positioned within the border region, and a one camera module is operatively interconnected with the light guide plate to sense light from the light guide plate and positioned within the border region. The display determines a position of a touch on the light guide plate by determining a location of frustrated total internal reflection within the light guide plate as a result of the touch on the light guide plate.

20 Claims, 18 Drawing Sheets

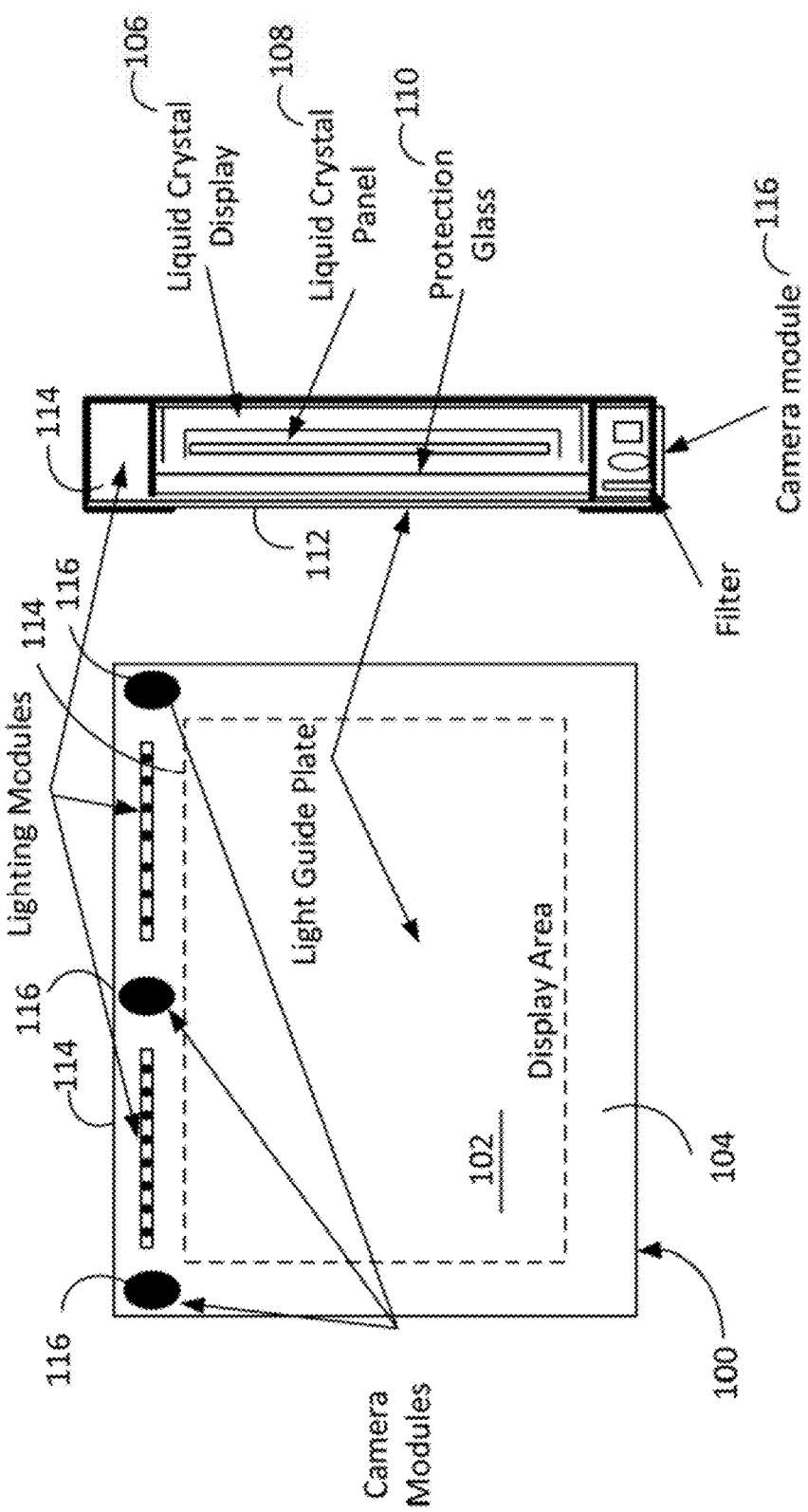

TOUCH SENSITIVE DISPLAY SYSTEM

CROSS-REFERENCE TO RELATED APPLICATIONS

Not applicable.

BACKGROUND OF THE INVENTION

The present invention relates to a display, and in particular to a display with a touch sensitive layer thereon.

The local transmittance of a liquid crystal display (LCD) panel or a liquid crystal on silicon (LCOS) display can be varied to modulate the intensity of light passing from a backlit source through an area of the panel to produce a pixel that can be displayed at a variable intensity. Whether light from the source passes through the panel to an observer or is blocked is determined by the orientations of molecules of liquid crystals in a light valve.

Since liquid crystals do not emit light, a visible display requires an external light source. Small and inexpensive LCD panels often rely on light that is reflected back toward the viewer after passing through the panel. Since the panel is not completely transparent, a substantial part of the light is absorbed while it transits the panel and images displayed on this type of panel may be difficult to see except under the best lighting conditions. On the other hand, LCD panels used for computer displays and video screens are typically backlit with fluorescent tubes or arrays of light-emitting diodes (LEDs) that are built into the sides or back of the panel. To provide a display with a more uniform light level, light from these point or line sources is typically dispersed in a diffuser panel before impinging on the light valve that controls transmission to a viewer.

The transmittance of the light valve is controlled by a layer of liquid crystals interposed between a pair of polarizers. Light from the source impinging on the first polarizer comprises electromagnetic waves vibrating in a plurality of planes. Only that portion of the light vibrating in the plane of the optical axis of a polarizer can pass through the polarizer. In an LCD the optical axes of the first and second polarizers are arranged at an angle so that light passing through the first polarizer would normally be blocked from passing through the second polarizer in the series. However, a layer of translucent liquid crystals occupies a cell gap separating the two polarizers. The physical orientation of the molecules of liquid crystal can be controlled and the plane of vibration of light transiting the columns of molecules spanning the layer can be rotated to either align or not align with the optical axes of the polarizers.

The surfaces of the first and second polarizers forming the walls of the cell gap are grooved so that the molecules of liquid crystal immediately adjacent to the cell gap walls will align with the grooves and, thereby, be aligned with the optical axis of the respective polarizer. Molecular forces cause adjacent liquid crystal molecules to attempt to align with their neighbors with the result that the orientation of the molecules in the column spanning the cell gap twist over the length of the column. Likewise, the plane of vibration of light transiting the column of molecules will be "twisted" from the optical axis of the first polarizer to that of the second polarizer. With the liquid crystals in this orientation, light from the source can pass through the series polarizers of the translucent panel assembly to produce a lighted area of the display surface when viewed from the front of the panel.

To darken a pixel and create an image, a voltage, typically controlled by a thin film transistor, is applied to an electrode in an array of electrodes deposited on one wall of the cell gap. The liquid crystal molecules adjacent to the electrode are attracted by the field created by the voltage and rotate to align with the field. As the molecules of liquid crystal are rotated by the electric field, the column of crystals is "untwisted," and the optical axes of the crystals adjacent the cell wall are rotated out of alignment with the optical axis of the corresponding polarizer progressively reducing the local transmittance of the light valve and the intensity of the corresponding display pixel. Color LCD displays are created by varying the intensity of transmitted light for each of a plurality of primary color elements (typically, red, green, and blue) that make up a display pixel.

Referring to FIG. 1, a liquid crystal display (LCD) 50 (indicated by a bracket) comprises, a backlight 52 and a light valve 54 (indicated by a bracket). Since liquid crystals do not emit light, most LCD panels are backlit with fluorescent tubes or arrays of light-emitting diodes (LEDs) that are built into the sides or back of the panel. To disperse the light and obtain a more uniform intensity over the surface of the display, light from the backlight 52 typically passes through a diffuser 56 before impinging on the light valve 54.

The transmittance of light from the backlight 52 to the eye of a viewer 58, observing an image displayed on the front of the panel, is controlled by the light valve 54. The light valve 54 comprises a pair of polarizers 60 and 62 separated by a layer of liquid crystals 64 contained in a cell gap between the polarizers. Light from the backlight 52 impinging on the first polarizer 62 comprises electromagnetic waves vibrating in a plurality of planes. Only that portion of the light vibrating in the plane of the optical axis of a polarizer can pass through the polarizer. In an LCD light valve, the optical axes of the first 62 and second 60 polarizers are typically arranged at an angle so that light passing through the first polarizer would normally be blocked from passing through the second polarizer in the series. However, the orientation of the translucent crystals in the layer of liquid crystals 64 can be locally controlled to either "twist" the vibratory plane of the light into alignment with the optical axes of the polarizers, permitting light to pass through the light valve creating a bright picture element or pixel, or out of alignment with the optical axis of one of the polarizers, attenuating the light and creating a darker area of the screen or pixel.

The surfaces of a first glass plate 63 and a second glass plate 61 form the walls of the cell gap and are buffed to produce microscopic grooves to physically align the molecules of liquid crystal 64 immediately adjacent to the walls. Molecular forces cause adjacent liquid crystal molecules to attempt to align with their neighbors with the result that the orientation of the molecules in the column of molecules spanning the cell gap twist over the length of the column. Likewise, the plane of vibration of light transiting the column of molecules will be "twisted" from the optical axis of the first polarizer 62 to a plane determined by the orientation of the liquid crystals at the opposite wall of the cell gap. If the wall of the cell gap is buffed to align adjacent crystals with the optical axis of the second polarizer, light from the backlight 52 can pass through the series of polarizers 60 and 62 to produce a lighted area of the display when viewed from the front of the panel (a "normally white" LCD).

To darken a pixel and create an image, a voltage, typically controlled by a thin film transistor, is applied to an electrode in an array of transparent electrodes deposited on the walls of the cell gap. The liquid crystal molecules adjacent to the electrode are attracted by the field produced by the voltage and rotate to align with the field. As the molecules of liquid crystal are rotated by the electric field, the column of crystals is "untwisted," and the optical axes of the crystals adjacent to the cell wall are rotated progressively out of alignment with the optical axis of the corresponding polarizer progressively reducing the local transmittance of the light valve 54 and attenuating the luminance of the corresponding pixel. Conversely, the polarizers and buffing of the light valve can be arranged to produce a "normally black" LCD having pixels that are dark (light is blocked) when the electrodes are not energized and light when the electrodes are energized. Color LCD displays are created by varying the intensity of transmitted light for each of a plurality of primary color (typically, red, green, and blue) sub-pixels that make up a displayed pixel. A set of color filters 84, a polarizer 82 arranged in front of the touch screen can significantly reduce the reflection of ambient light, also a cover plate 86 may be placed over the polarizer 82.

The aforementioned example was described with respect to a twisted nematic device. However, this description is only an example and other devices may likewise be used, including, but not limited to, multi-domain vertical alignment (MVA), patterned vertical alignment (PVA), in-plane switching (IPS), and super-twisted nematic (STN) type LCDs.

In some cases, a resistive touch screen is included over the display which includes a pair of flexible sheets coated with a resistive material separated by an air gap or microdots. A conductive structure may be included on the interior surface of each of the flexible sheets, such that when contact is made to the surface of the touchscreen, the two sheets are pressed together. On the sheets are conductive horizontal and vertical lines that, when pressed together, register the location of the touch. The resistive touch screen responds to pressure exerted on its surface by identifying the position of the touch. Unfortunately, resistive touch screens are complex to construct and tend to be expensive, especially for large displays.

In some cases, a capacitive touch screen is included over the display which includes an insulator coated with a transparent conductor. Touching the surface of the screen, with a conductive conductor such as the human body, results in a distortion of the screen's electrostatic field, measurable as a change in capacitance. A suitable technology may be used to determine the position of the touch. Unfortunately, capacitive touch screens are complex to construct and tend to be expensive, especially for large displays.

It is desirable for a touch screen that is not excessively complex and tends to be relatively inexpensive, especially for large displays. Moreover, the touch screen should also be suitable for use with a light emitting stylus.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 2 illustrates a display configuration with light modules and camera modules.
FIG. 3 illustrates a side view of a display with a touch later thereon.

DETAILED DESCRIPTION OF PREFERRED EMBODIMENT

Figure 1:
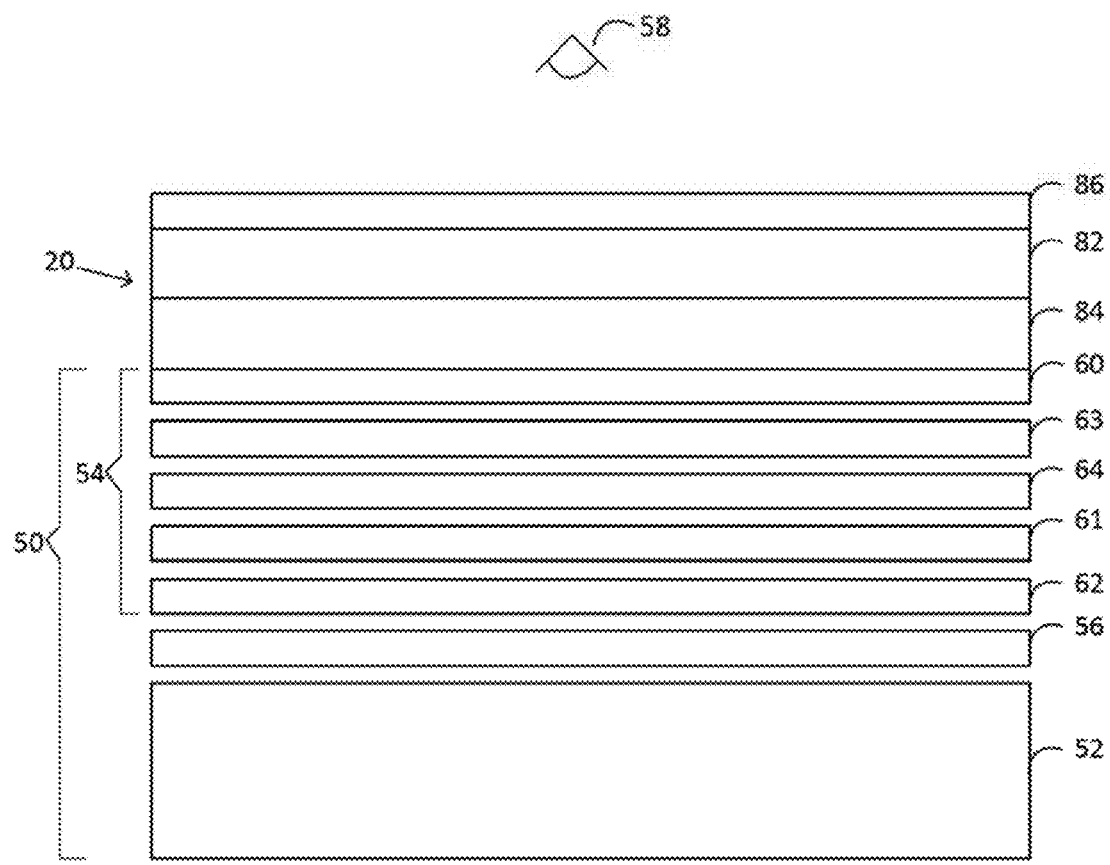
FIG. 1 illustrates a liquid crystal display.

Referring to FIG. 2, an exemplary display 100 includes a display area 102. The display may be any type of display, such as a cathode ray tube, a liquid crystal display, a plasma display, etc. The display area 102 is the region of the display that emits light, such as in the form of an image, that is viewable by a viewer of the display 100. A border region 104 surrounds one or more of the peripheral edge regions of the display area 102. Referring also to FIG. 3, the display 100 may include a liquid crystal display 106 that includes the liquid crystal panel 108 and/or protection glass 110. Overlaying the protection glass 110 is a light guide plate 112. Operatively interconnected with the light guide plate 112 are one or more lighting modules 114. The lighting modules 114 provide light that is guided into the light guide plate 112. Typically the light guide plate has a planar exterior surface. The light guide plate 112 may be any suitable material, such as glass or acrylic material, that guides light within the light guide plate 112. Typically, the light is maintained within the light guide plate 112 by total (or substantial) internal reflections. The lighting modules 114 may include one or more light emitting diodes or other types of light sources. The light emitting diodes or other type of light sources may emit light with any suitable set or range of wavelengths. The light emitting diodes or other type of light sources may each emit light having the same or different set or range of wavelengths and/or light provided to the light guide plate is different as a result of using filters. Further, the primary wavelengths of the light may be selected in accordance with the light guide plate so that the light is suitably guided therein.

One or more light sensing devices 116, such as two dimensional camera sensors, may be operatively interconnected with the light guide plate 112. The light sensing devices 116 are preferably selected and interconnected in such a manner that they sense the light emitted by the lighting modules 114. For example, the light sensing devices may be positioned proximate one or more corners of the display and/or along one or more edges of the display.

As illustrated in FIG. 2, the lighting modules 114 and camera modules 116 may be positioned along the same edge of the display. In this manner, when the light guide is in a steady state mode with light being provided thereto, the camera modules 116 will sense a consistent background image. In general, the light is reflected internally and there is no signal loss (or limited signal loss) at the surface boundary. This is referred to as total internal reflection. If the viewer touches the display, such as with a finger or other object with a higher index of refraction than the light guide plate, then light from the lighting modules 114 is partially disrupted proximate the location of the touch. Part of the disrupted light exits the front of the light guide plate, part of the disrupted light exits the back of the light guide plate, part of the light is scattered backward generally along its original path, and part of the light is scattered forward generally along its original path. Overall, as a result of the disruption, light is scattered in substantially all directions to a greater or lesser degree. This may be referred to as frustrated total internal reflection. The camera modules 116, when the display undergoes a frustrated total internal reflection, tend to sense an increase in the signal levels as a result of the additional reflected light.

Figure 4:
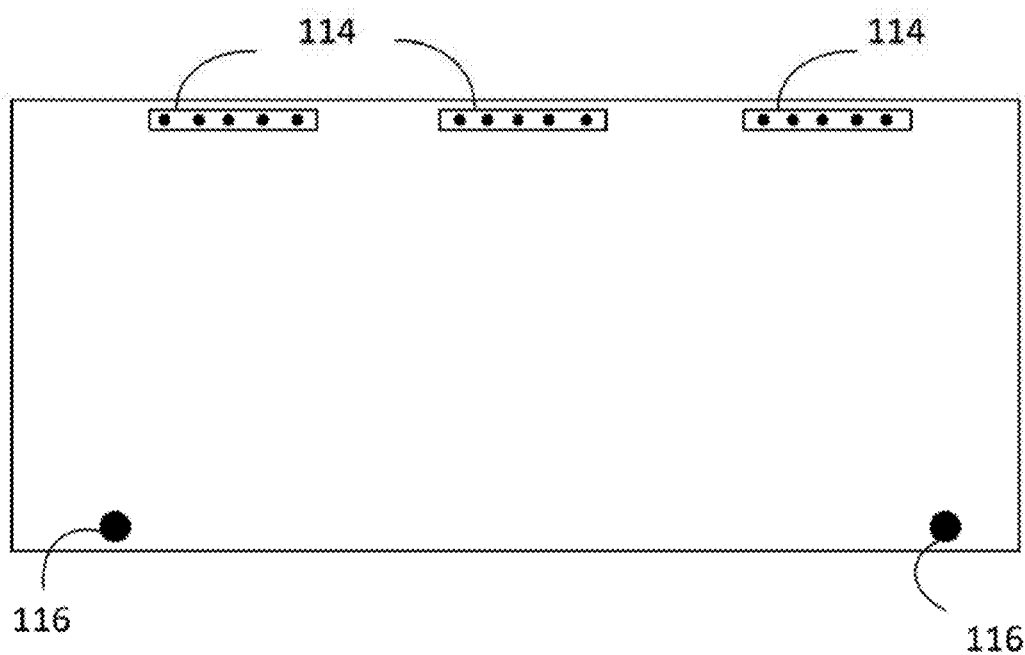
FIG. 4 illustrates a display configuration with light modules and camera modules.

As illustrated in FIG. 4, the lighting modules 114 and camera modules 116 may be positioned along different edges of the display. In this manner, when the light guide is in a steady state mode with light being provided thereto, the camera modules 116 will sense a consistent background image. In general, the light is reflected internally and there is no signal loss (or limited signal loss) at the surface boundary. This is referred to as total internal reflection. If the viewer touches the display, such as with a finger or other object with a higher index of refraction than the light guide plate, then light from the lighting modules 114 is partially disrupted proximate the location of the touch. Part of the disrupted light exits the front of the light guide plate, part of the disrupted light exits the back of the light guide plate, part of the light is scattered backward generally along its original path, and part of the light is scattered forward generally along its original path. Overall, as a result of the disruption, light is scattered in substantially all directions to a greater or lesser degree. This may be referred to as frustrated total internal reflection. The camera modules 116, when the display undergoes a frustrated total internal reflection, tend to sense a decrease in the signal levels as a result of the decrease in transmitted light.

Figure 5:
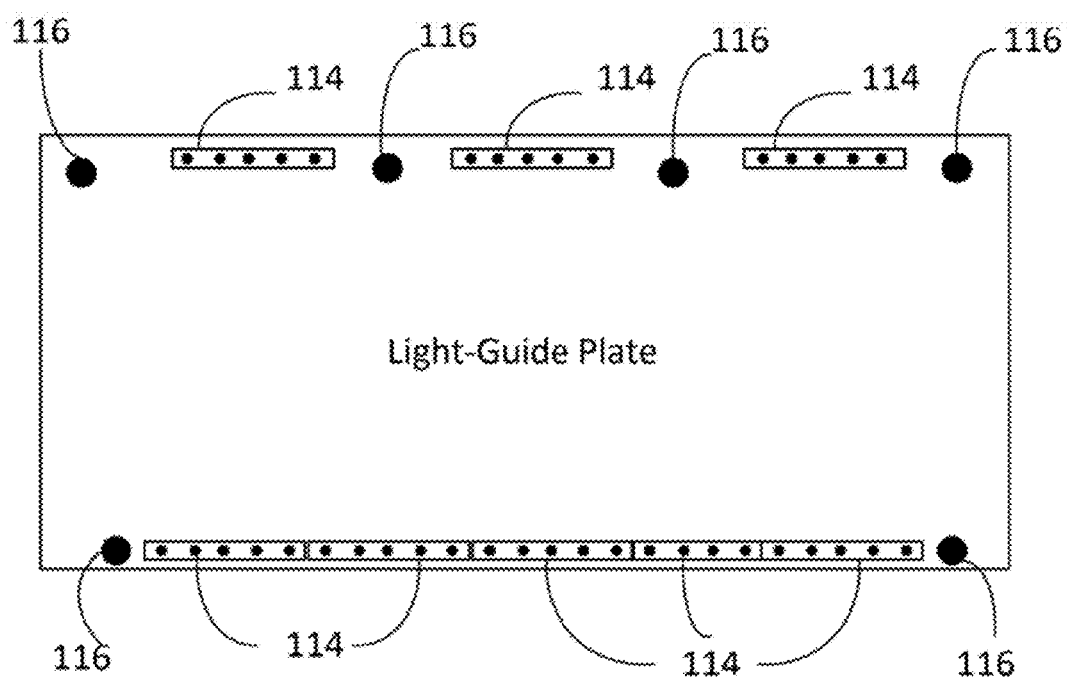
FIG. 5 illustrates a display configuration with light modules and camera modules.

As illustrated in FIG. 5, the lighting modules 114 and one or more camera modules 116 may be positioned along both a different edge of the display and edge of the display. In this manner, when the light guide is in a steady state mode with light being provided thereto, the camera modules 116 will sense a consistent background image. In general, the light is reflected internally and there is no signal loss (or limited signal loss) at the surface boundary. This is referred to as total internal reflection. If the viewer touches the display, such as with a finger or other object with a higher index of refraction than the light guide plate, then light from the lighting modules 114 is partially disrupted proximate the location of the touch. Part of the disrupted light exits the front of the light guide plate, part of the disrupted light exits the back of the light guide plate, part of the light is scattered backward generally along its original path, and part of the light is scattered forward generally along its original path. Overall, as a result of the disruption, light is scattered in substantially all directions to a greater or lesser degree. This may be referred to as frustrated total internal reflection. The camera modules 116, when the display undergoes a frustrated total internal reflection, tend to sense increases and decreases in the signal levels at different camera modules as a result of the disruption.

As a general matter, one or more lighting modules are positioned to provide light around the perimeter region of the light guide plate at one or more locations. In addition, one or more camera modules are positioned to sense the light around the perimeter region of the light guide plate at one or more locations. The change of light reaching the camera modules and/or the pattern of light reaching the camera modules may be used to determine the position of touching the display. The change of light reaching the camera modules and/or the pattern of light reaching the camera modules may be used to determine a plurality of simultaneous positions of touching the display.

The behavior of the injected light is measured by the one or more camera modules using a suitable technique. One technique is to position the camera module underneath, or otherwise generally behind the light guide plate, to sense light exiting the light guide plate directly below the location of the touch. While such a design makes the detection and localization of the touch signal relatively straightforward, it also imposes considerable spatial constraints which are generally unsuitable for maintaining a display especially thin. Also, the construction of an interactive table-top light sensitive device with cameras located in a position not supported by the display would be problematic. Thus, it is desirable to mount the camera modules in a manner supported by (directly or indirectly) and operatively interconnected with the light guide plate which facilitates the light being directed to the camera modules positioned external to the display area 102 by the use of the light in the light guiding structure. One such light guiding structure may include, for example, a conical depression cut into the light guide plate immediately above the imaging device of the camera modules. The conical depression provides for a large field of view even if the cameras are not provided together with wide-angle lenses, and permits light from all (or substantially all) directions to be sensed by each camera module.

Figure 6:
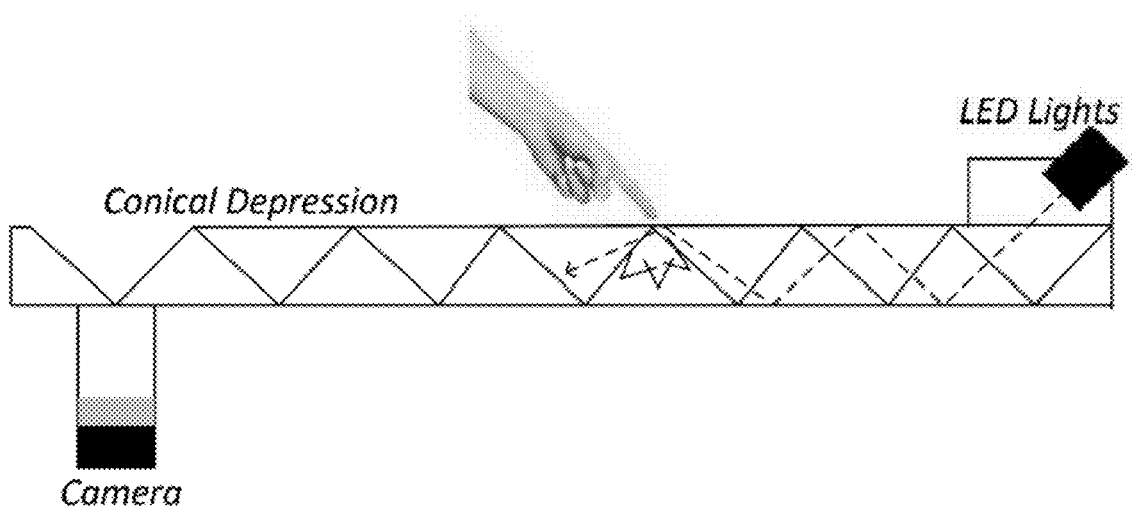
FIG. 6 illustrates a light guide plate with a conical depression.
Figure 7:
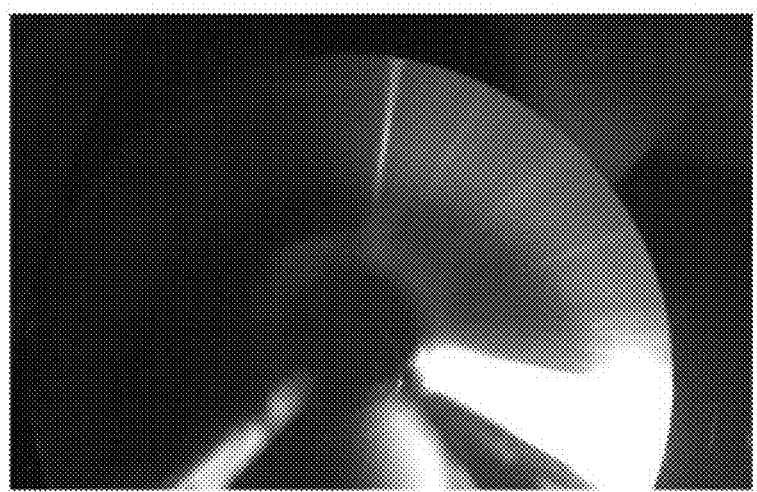
FIG. 7 illustrates a radial image.

Referring to FIG. 6, an exemplary conical depression is illustrated. The conical depression guides the light to the imaging device. Referring also to FIG. 7, an exemplary two dimensional image, of multiple streaks of light, resulting from touching the light guide plate at a plurality of locations is illustrated. The relative positions of the light modules and camera modules determine the appearance of the signal that is registered when a finger touches the light guide plate. If the sensors of the camera modules are located on the opposite side of the light source(s), then they can be used to measure the partially blocked light from the light sources. This mode of operation may be referred to as a shadow mode, since the touch input results in a darker band in the captured image that is darker than the background. Alternatively, if the sensors of the camera modules are placed on the same side as the light source(s), then they can be used to measure the light reflected back by the touch input, since the finger also serves as a diffuser that reflects light in all directions. The light received by the camera module is added to the existing background light, and the touch area appears as a bright band in the captured image. This operating mode may be referred to as a scattering mode.

In some configurations, the operating intervals of the light sources should be synchronized. For the system shown in FIG. 5, for example, if the bottom camera modules are turned on to capture touch signals in scattering mode, the light sources at the bottom should be turned on as well, so that the cameras can measure the light reflected by the finger touches. However, if the camera modules on top are capturing at the same time, the light sources at the top should be turned on, which results in light from the top light sources entering the bottom camera modules. As a result, the touch signal is obscured by the direct light from the light sources, which is considerably stronger than the light reflected at the touch location. On the other hand, if the system is operating in shadow mode, the light sources on the top should be turned on when the bottom camera modules are in capture mode. If the bottom light sources are also turned on during the same interval, the touch signal—which is supposed to get dimmer in shadow mode—will become brighter due to the light from the bottom sources being reflected back at the touch location. In order to reduce such issues and enable more accurate signal detection, the camera modules on opposite sides of the light guide plate should be active during substantially non-overlapping intervals. Consequently, the corresponding light modules should be synchronized with the camera modules. Synchronization may be achieved by using the output signals from the camera modules to drive a light control circuit, which in turn toggles the lights on and off.

Figure 8:
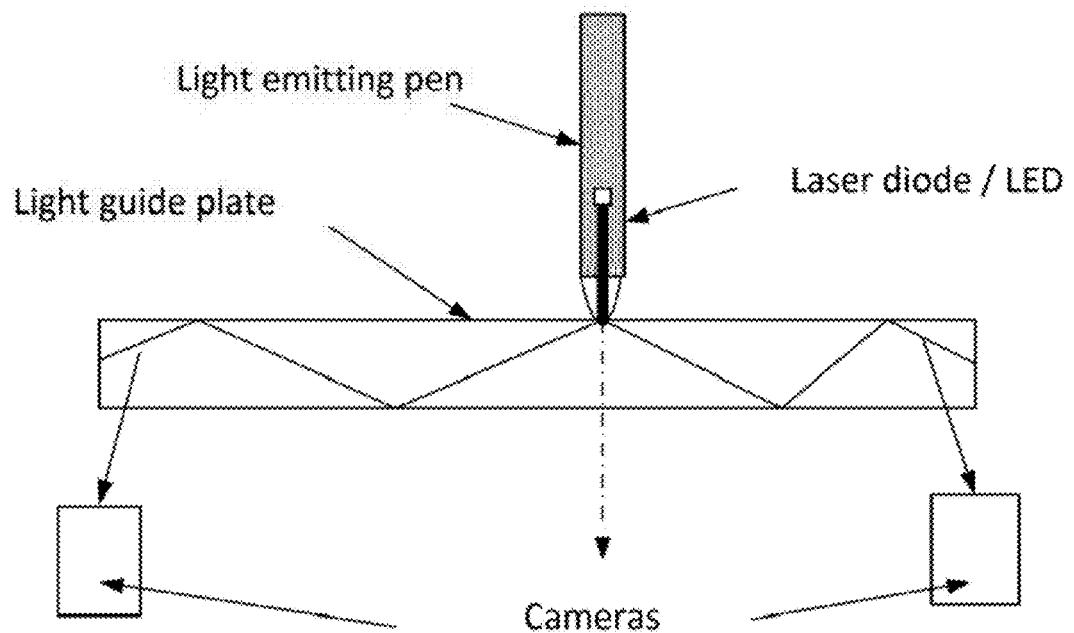
FIG. 8 illustrates a pen input to a touch display.
Figure 9:
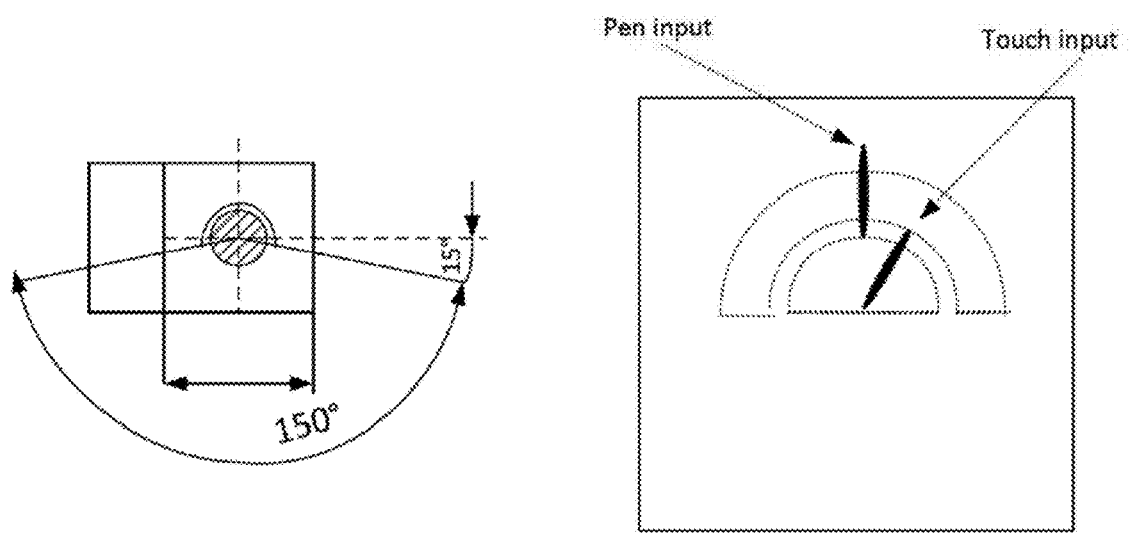
FIG. 9 illustrates a filter for touch and pen inputs with resulting image.

The system may also be used to locate illumination inputs from an active stylus or pen. For example, a pressure-activated light pen that emits infrared light at a specific wavelength or a pen with a selectable on/off switch, may be used to inject light into the light guide plate. As illustrated in FIG. 8, when the pen touches, or is otherwise directing light at the display, a light emitter circuit is activated. Some of the light that enters the light guide plate travels within the light guide plate and can be captured by the camera modules. The signal from this active light source appears as a bright band in the captured image, and can therefore be detected using the techniques used for detecting finger touches. As a result, the display is suitable to provide simultaneous pen and touch interactivity using the same imaging devices. If desired, the pen and touch input signals may be discriminated from one another by using light sources having different wavelengths for each of the pens (if desired) and the light modules, together with utilizing optical filters to spatially separate the pen and finger inputs in the captured images. FIG. 9 depicts an exemplary filter design and a corresponding signal separation observed in the captured image.

Figure 10:
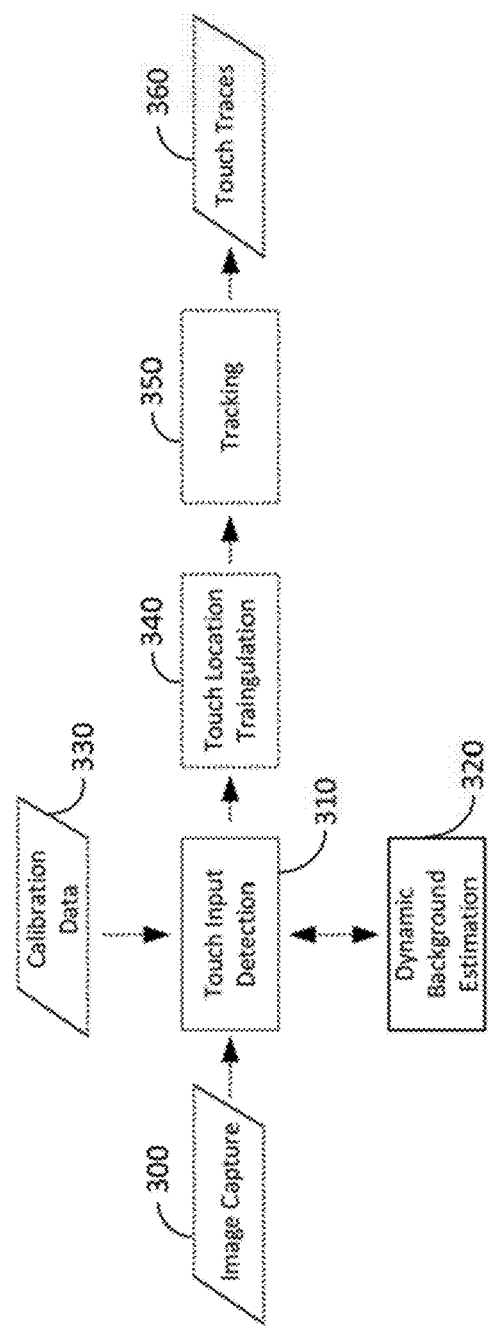
FIG. 10 illustrates a touch input system.

Referring to FIG. 10, an exemplary system for touch detection, touch localization, and touch tracking is illustrated. One or more images are captured 300 by one or more of the camera modules. A touch input detection 310 determines the existence of one or more touches by analysis of the characteristics of the captured images. The touch input detection 310 may further be based upon dynamic background estimation 320 and calibration data 330. The touch may be characterized as a generally straight line within a fan region defined by the conical cut's field of view. Thus, the input from each camera module may be analyzed to detect the presence of and determine the location of one or more touch inputs. A touch location triangulation 340 is used to determine the touch location based upon one or more of the detected touches. For example, when a touch is detected from multiple camera modules, the corresponding detections from the camera modules may be combined to determine the touch position on the two dimensional surface of the display using a triangulation technique. A tracking process 350 may be used to track the location of one or more touch positions over time. The tracking may be used to improve the detection reliability. The locations over time may be presented as touch traces 360.

A display may include a series (or plurality) of single light emitting diodes arranged in a parallel fashion along the edge of the display, or other light sources, each of which provides illumination to a one-dimensional striped region across the display. The light sources may likewise be arranged to illuminate different regions of the display if the light guide plate includes different optically isolated regions. Corresponding camera modules may be associated with the different isolated regions.

Figure 11:
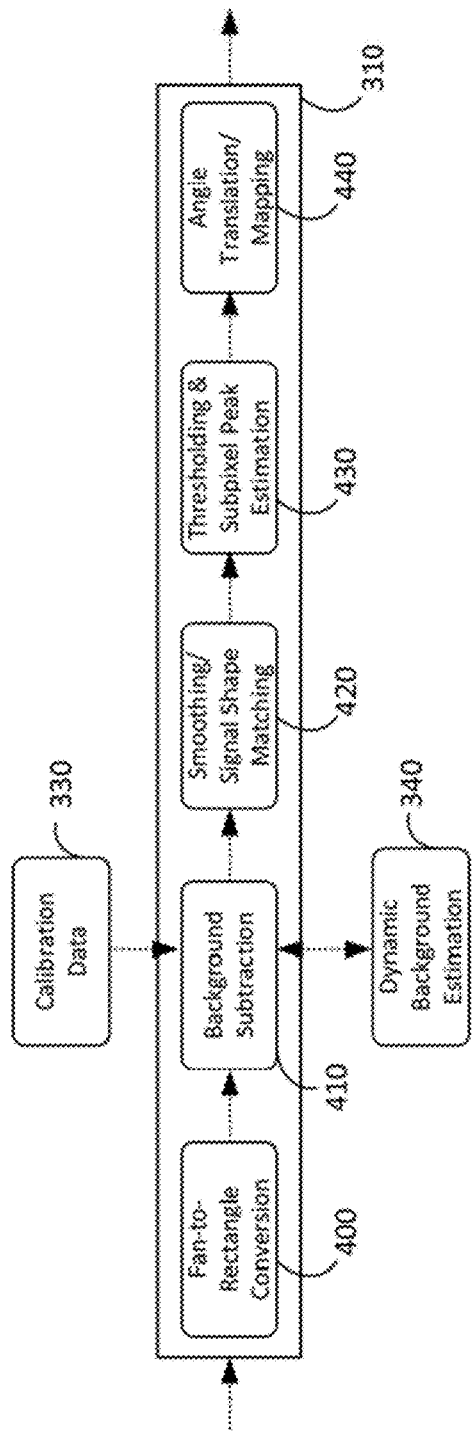
FIG. 11 illustrates a touch input detection.
Figure 12:
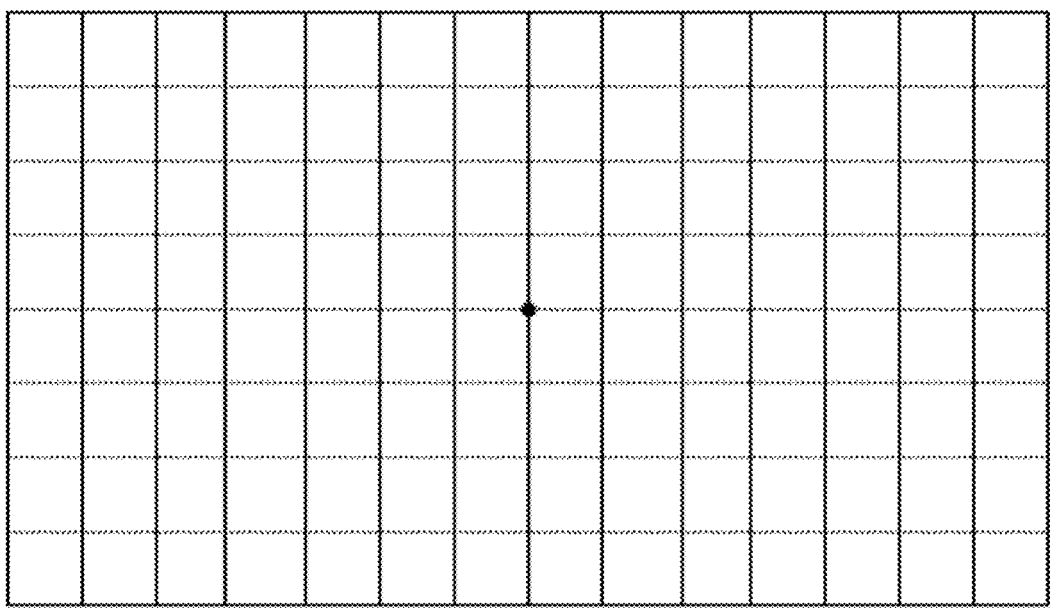
FIG. 12 illustrates a grid pattern.

Referring to FIG. 11, a more detailed process is illustrated for the touch input detection 310, as described below. Referring to FIG. 12, geometric calibration of the system may be used to establish the spatial relationship between the touch-induced signals captured by the camera modules and the actual positions of the touch inputs on the screen for the touch location triangulation 340 for the angle transition mapping 440. Due to optical distortions, the detected signal angle may not be linearly dependent on the actual touch angle. In order to compensate for discrepancies, a lookup table may be constructed to map detection angles to true angles. The calibration process may consist of two steps: first camera image calibration and second lookup table building. In both steps, the user touches on each of the grid points in the pattern shown in FIG. 12.

Figure 13:
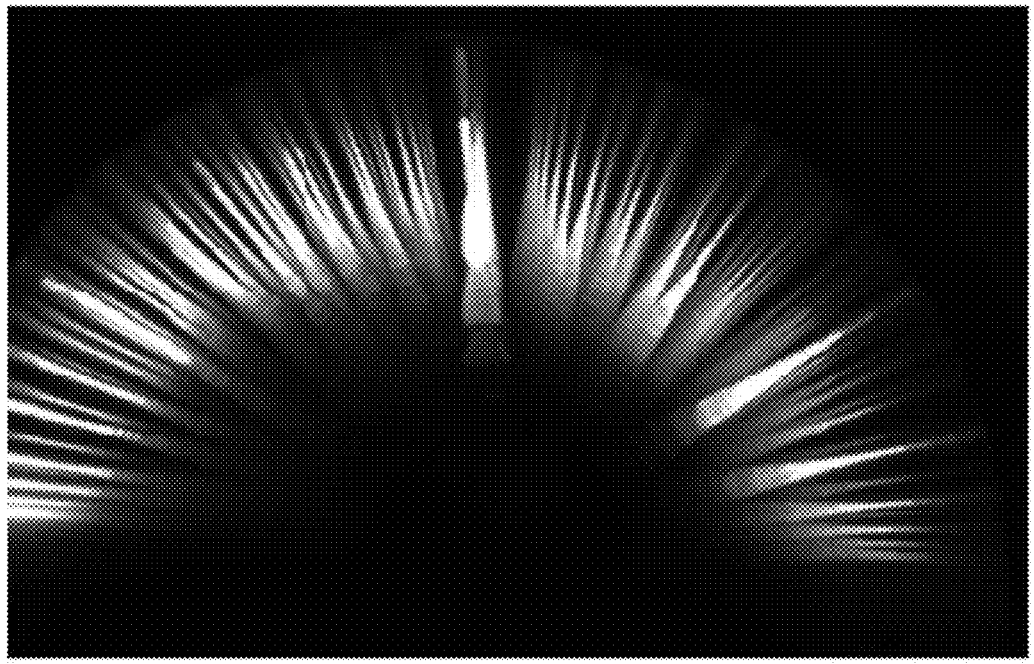
FIG. 13 illustrates a composite image from multiple touch inputs.

In the first step of the calibration procedure, the user is asked to touch on all the grid points on a pattern projected onto the display surface. The calibration module records the touch signals, and combines them into a single image, as shown in FIG. 13. From this composite image, the circle center for the signals, the field of view of the camera, and the inner and outer radii of the region of interest are computed. Once these parameters are defined, the next step of the calibration—lookup table construction—is initiated.

In the second step of calibration, the grid points are touched and processed once again. The relative angle of the signal input at each grid point is computed using the parameters from the last step. In addition, the true angle is computed with the known grid position and camera position. The signal angle and true angle are then used to build the lookup table.

Figure 14:
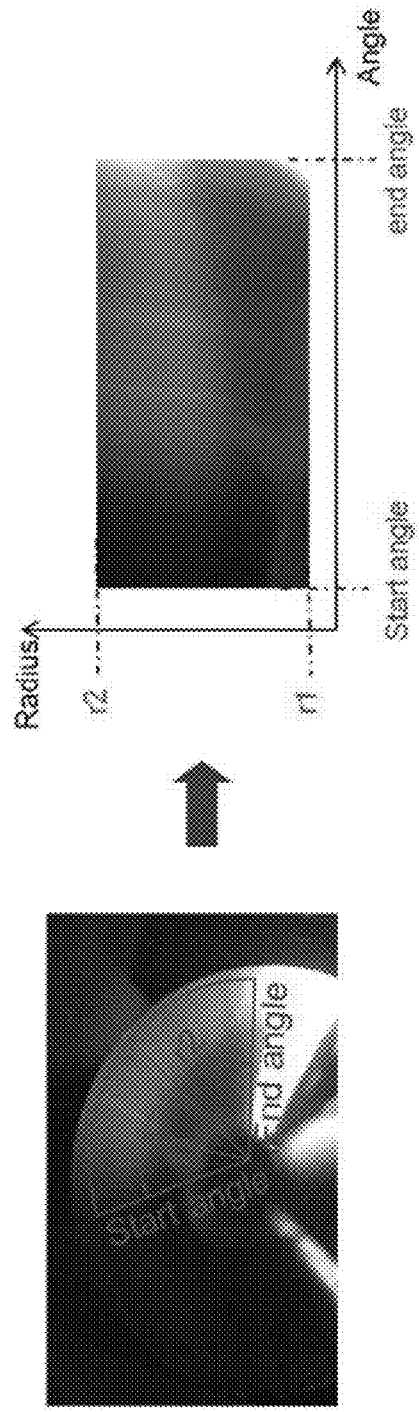
FIG. 14 illustrates a region of interest and a corresponding geometric transformation.

As noted previously, the camera modules capture circular or radial images, due to the system configuration. In the initial step of the calibration process, a fan-shaped region-of-interest (ROI) is determined for each camera module based on the composite image. The ROI specifies the area over which subsequent processing and touch input detection are performed. For each captured frame, a geometric transformation is performed to convert the fan-shaped ROI to a rectangular image 400, so that subsequent image processing steps can be performed efficiently. FIG. 14 depicts the original ROI and the resulting rectangular image following the transformation, respectively. Each row in the rectangular image corresponds to an arc in the original ROI, while each column represents $(r_2-r_1)$ samples in a given orientation.

The rectangle may be formed by a backwards lookup. One may denote the coordinate of a pixel in the rectangle as [x,y], the start angle as $\theta_1$, end angle as $\theta_2$, and rectangle dimension as [w,h]. Then, the angle of the corresponding pixel in the fan may be $\theta=(\theta_2-\theta_1)*(x/w)$. The radius of the corresponding pixel may be $r=(r_2-r_1)*(y/h)$. Without generality, one may assume [1 0] is the 0 angle axis, then the coordinate $[u\ v]^T$ of the corresponding pixel in the original image may be $$\begin{bmatrix} u \\ v \end{bmatrix} = \begin{bmatrix} \cos\theta & -\sin\theta \\ \sin\theta & \cos\theta \end{bmatrix} \begin{bmatrix} 1 \\ 0 \end{bmatrix} * r + \begin{bmatrix} u_0 \\ v_0 \end{bmatrix},$$

where $[u_0\ v_0]$ is the coordinate of the circle center. The resulting pixel $[u\ v]^T$ may be at subpixel location and bilinear interpolation may be used to determine the pixel value.

Following the geometric transform, the resulting image can be compressed into a one-dimensional data array by column-wise averaging. Each point on this one-dimensional array records average brightness of the pixels along a ray in a certain direction. Converting the two-dimensional image into a one-dimensional signal has two primary advantages. First, averaging suppresses image noise while retaining the signal strength around the peak locations. Second, computational requirements are considerably reduced by the reduced dimensionality of the signal.

In the scattering mode, a finger and/or pen touch on the light guide plate is visible as a bright line in the captured image. Hence, the presence of a touch signal in a given frame can be detected by first subtracting 410 the background image 340 from the frame and subsequently analyzing the difference image for bright regions. The differencing operation may be performed directly on the (transformed) images or on the one-dimensional arrays obtained upon data conversion. In the latter case, the background image for each camera is processed in the manner previously described.

As can be observed in FIG. 7, the background of the camera image is not uniform. This is partly due to the light reflected back from the opposite end of the light guide plate. In addition, ambient light and sensor noise from the cameras also contribute to increase the background brightness level. The background image 340 may be estimated in various ways. In the preferred embodiment, the first N frames from each camera module are used in the estimation (note that it is assumed these N frames do not contain any touch inputs). These frames are then converted into one-dimensional arrays, yielding N samples for each point of the one-dimensional array. Statistics are subsequently computed for each of these points using the available samples. Specifically, the sample mean and standard deviation is computed for all the points. The mean values are stored as the one-dimensional background, and the standard deviation is taken as an estimate for the ambient camera noise, which is later used in signal thresholding 430.

In order to adapt to gradual shifts in the ambient conditions (due to accumulation of dirt and smudges on the light guide plate, variations in the room lighting conditions, etc.) the background image/signal should be periodically updated 340. This may be done in various ways. In the preferred embodiment, every mth non-touch frame is used to update the initial estimate using a weighted average.

Figure 15:
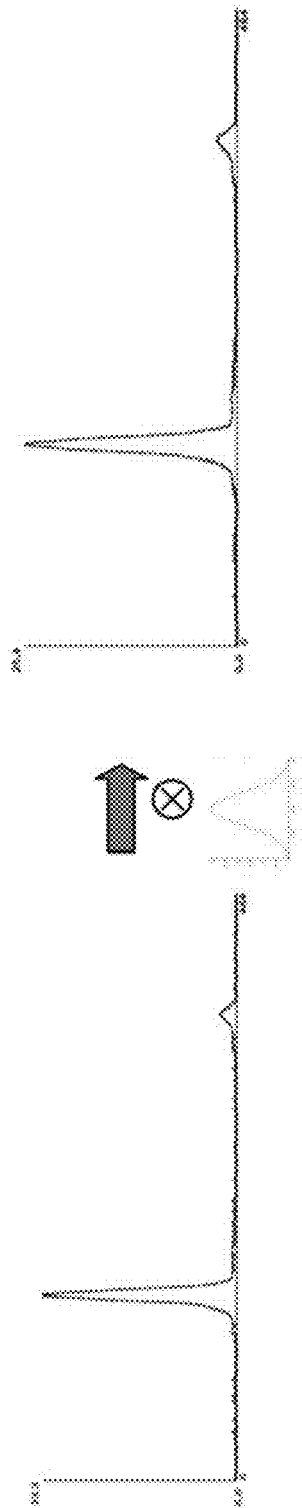
FIG. 15 illustrates signal filtering.

Following background subtraction 410, the resulting one-dimensional signal is convolved 420 with a Gaussian kernel in order to reduce the effects of noise and enhance the signal-to-noise ratio (SNR) prior to thresholding (aka smoothing). Since the shape of the peaks in the one-dimensional signal closely resemble a Gaussian kernel, the filter acts as a matched filter. FIG. 15 depicts the effects of filtering on the original one-dimensional signal.

Figure 16:
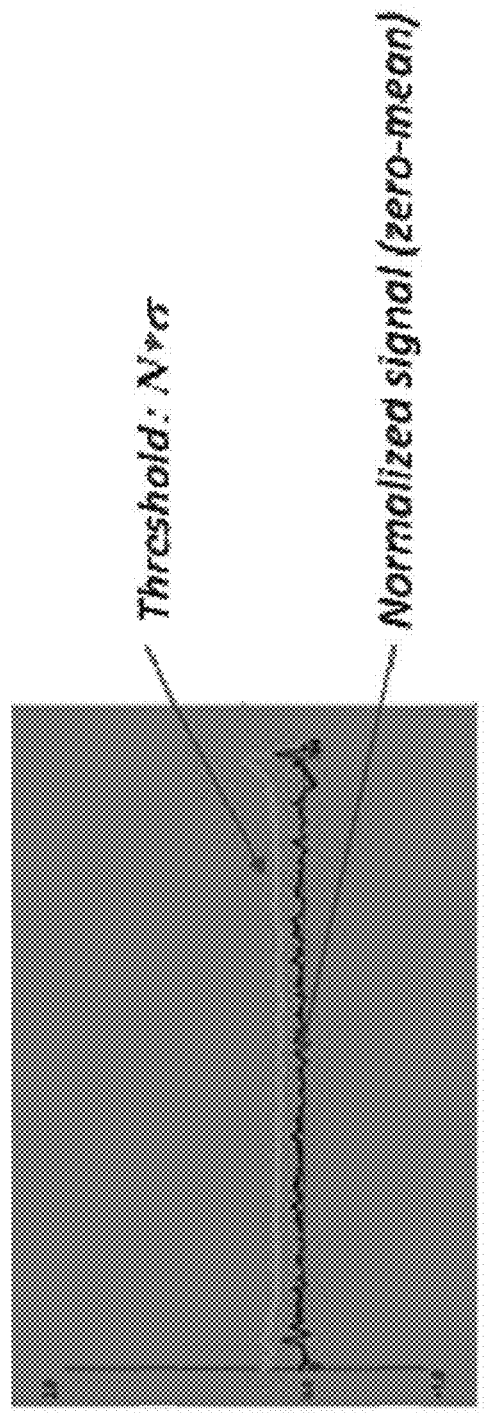
FIG. 16 illustrates signal thresholding.

Following the differencing 410 and smoothing 420 steps, the resulting signal is analyzed to determine the presence and locations of major peaks (and, consequently, touch input locations.) This may be achieved by a thresholding approach 430, where each sample point $x_i$ in the array is compared to a threshold $T_i$ specific to that point. The values for $T_i$ may be selected in various ways. In the preferred embodiment, $T_i$ is defined as a function of the sample standard deviation $\sigma_i$ computed during background estimation. More specifically, $T_i=K\sigma_i$ in the current implementation, K is empirically chosen as 4. The local maxima whose value exceeds the threshold are labeled as candidate touch locations. FIG. 16 shows the threshold values calculated based on the background estimate.

A sub-pixel refinement technique 430 may be applied to the detected peaks to accurately obtain the signal locations. Specifically, a parabola is preferably is fitted to the detected peak and its immediate neighbors. The peak of the fitted curve is then chosen as the signal location, providing sub-pixel detection accuracy.

The signals detected on the one dimensional arrays are converted to corresponding lines on the screen. During calibration, the location of the screen center is registered and used as the reference angle for other detections. For each detected touch location, the pixel distance is first computed by comparing its one-dimensional location to that of the reference signal. Then, this pixel distance is converted into the angle distance to reference signal, given that pixel is linearly dependent on angle during fan-to-rectangle conversion. The resulting angle difference is the relative angle of the signal to the reference on the capture image. Finally, the lookup table that was constructed in the second step of calibration is used to find the true angle of the detected touch to the screen center. Once the relative angle to screen center is obtained the signal line on screen given the location of the camera is computed 440.

Figure 17:
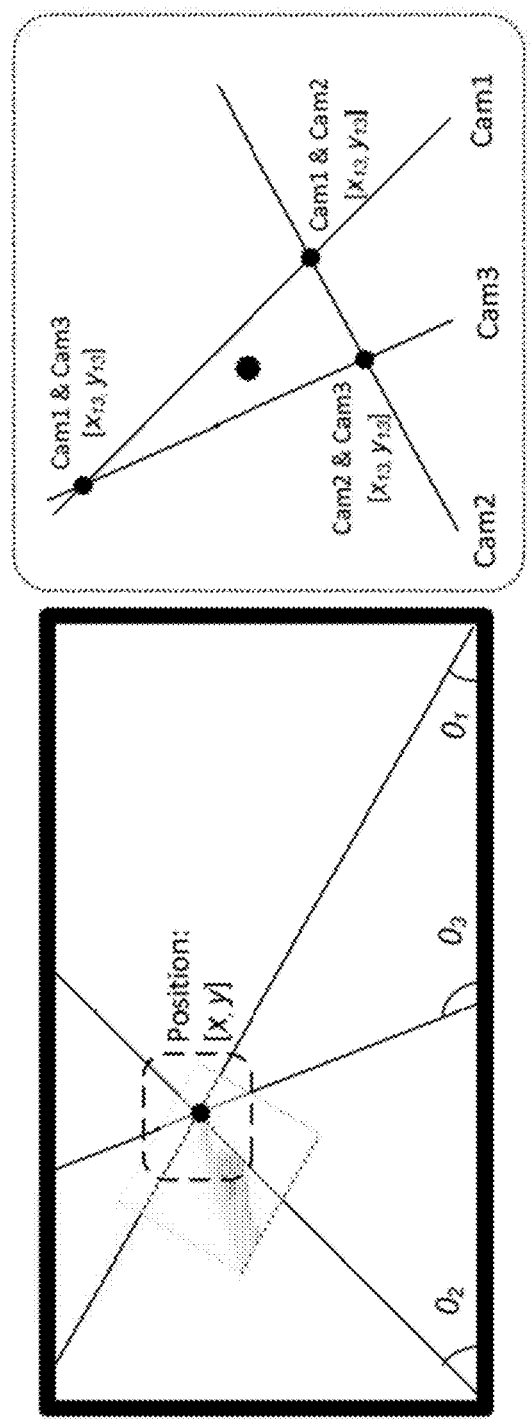
FIG. 17 illustrates single touch detection.

Referring to FIG. 17, if there is only a single touch input to the system, each camera will have a single detection. In this case, finding the touch position may be finding the intersection of the corresponding detection lines from the camera modules. The lines are unlikely to actually intersect at a single point, and a technique may be used to estimate the touch location from the detection lines. In the preferred embodiment, a least-square approach is employed to find the optimal point.

If more than one touch is present at a given time, each camera will have multiple detections. The single-touch position technique is not applicable, since correspondences between detections from different cameras are not available. The fundamental principle behind the preferred multi-touch detection technique is to initialize candidate positions on the screen, then use the detections from all cameras to vote for these candidates. Randomly initializing these candidates is not the best solution, as this requires a large number of points to cover the entire screen at a certain density. Thus, it is more desirable to choose the candidates at those positions where one has higher confidence than other places of the screen. One may choose to initialize the candidates at all the possible intersections of two cameras. Then information from the rest of the cameras is used to vote for these candidates. Basically, each detection for the rest of the cameras will assign a weight to the candidates, and the weight is inversely proportional to the distance from the candidate. The weights from all the rest of the cameras are accumulated for each candidate. The true touch positions are those candidates with highest weights.

Figure 18:
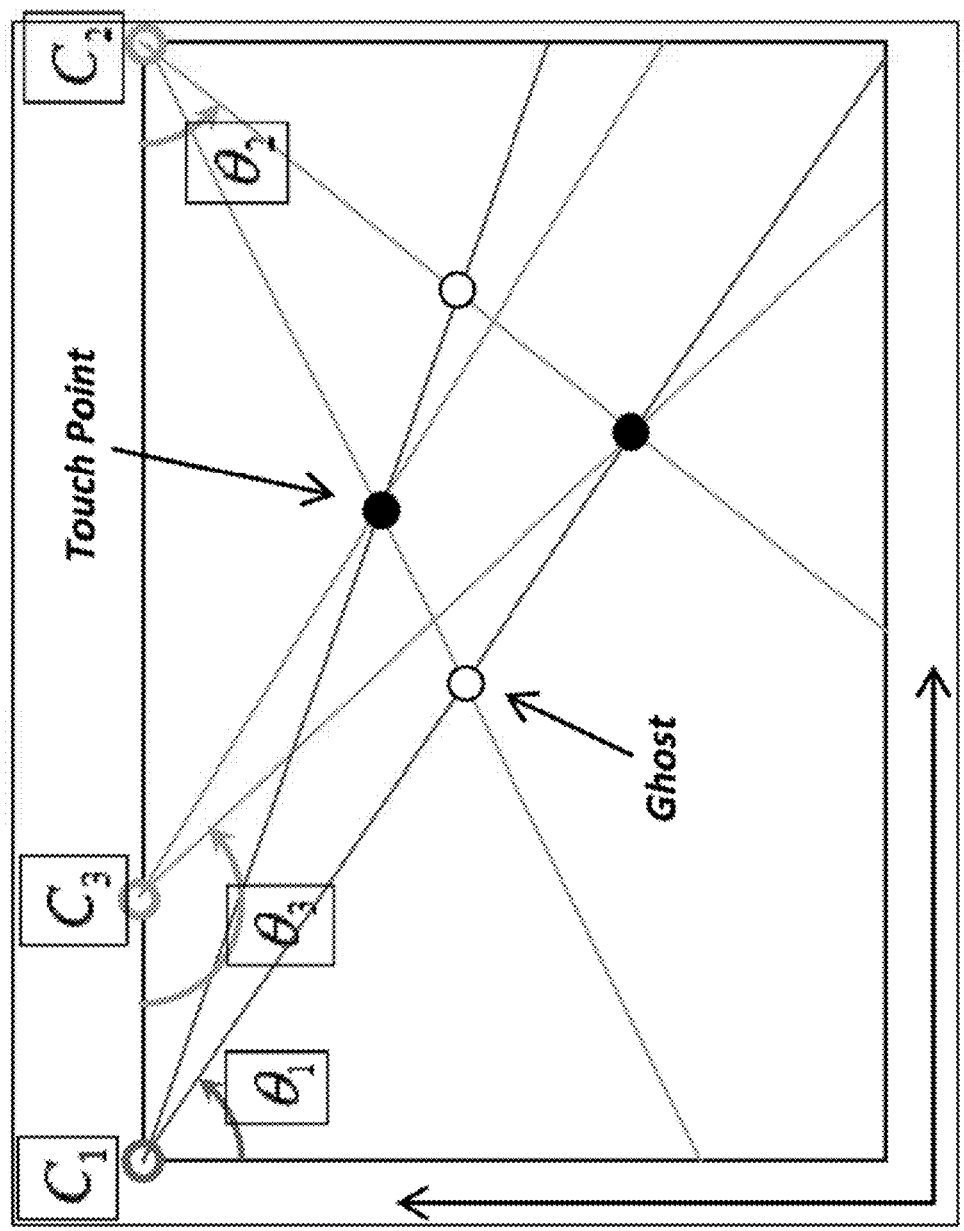
FIG. 18 illustrates multi-touch touch detection.

For example in FIG. 18, the four intersections of C1 and C2 are all initialized as candidates. Detections in C3 are used to assign weight to all the candidates, the 2 true touches will receive much higher weight than the 2 ghost touches.

Figure 19:
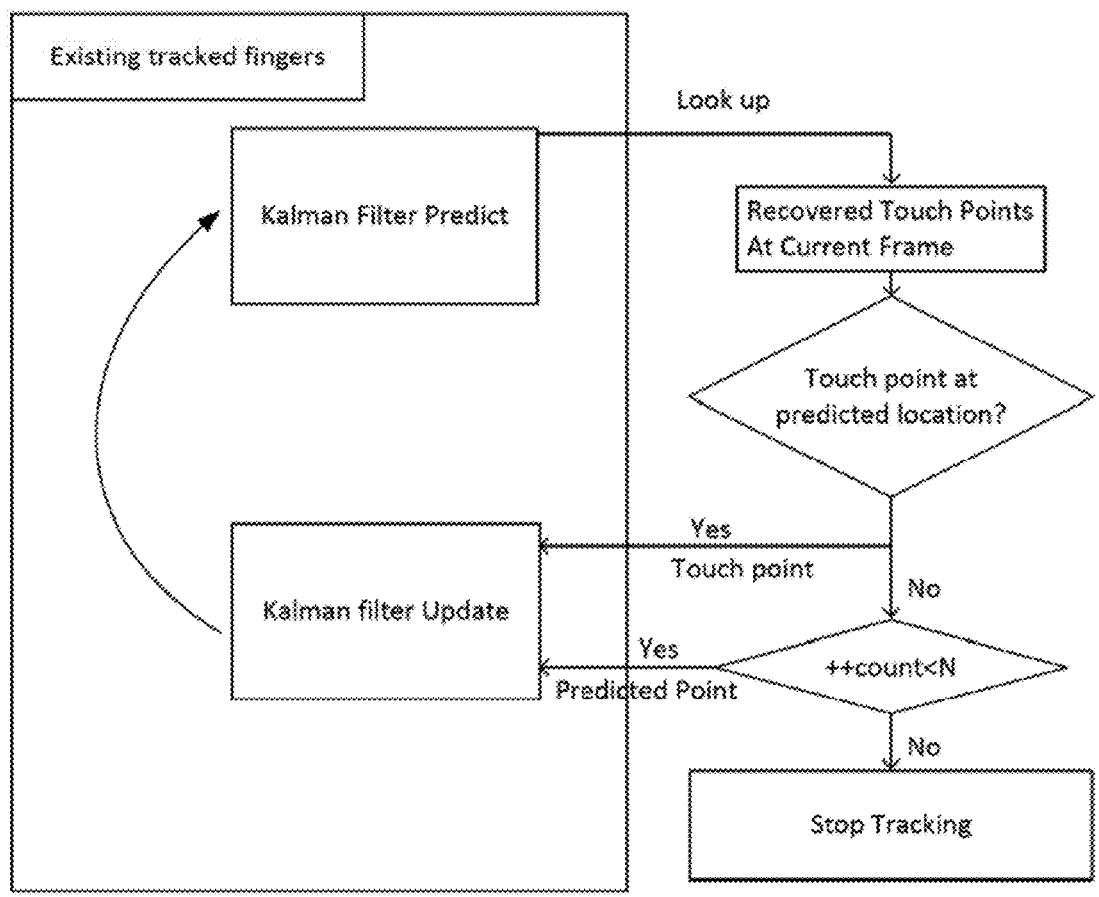
FIG. 19 illustrates a touch tracking system.

Referring to FIG. 19, the system may use a Kalman filter to track finger movements, so that finger traces can be recorded and recognized for gesture understanding. For each detected touch in a frame, the system determines whether it belongs to an existing finger or a new input. Therefore, it is desirable to track all existing touch points. The Kalman filter may predict the current locations of the fingers that are being tracked. If a detected touch is at a predicted position, it is taken as belonging to an existing finger. Otherwise, the system treats it as a new finger.

The prediction for each tracked finger may be by evolving its state $s=[x\ y\ v_x\ v_y]$ by:

$$S^{t+1} = \begin{bmatrix} 1 & 0 & 1 & 0 \\ 0 & 1 & 0 & 1 \\ 0 & 0 & 1 & 0 \\ 0 & 0 & 0 & 1 \end{bmatrix} S^t + \begin{bmatrix} \frac{1}{2}a_x \\ \frac{1}{2}a_y \\ a_x \\ a_y \end{bmatrix}.$$

Here, $a_x$ and $a_y$ denote the random noise of acceleration.

The system may search the neighborhood of the predicted finger position for touch. If a touch input is found (the true finger location), it is used to update the state of this tracked finger. Otherwise, the predicted finger position is input to the Kalman filter to update the state. If there is no touch found for a tracked finger for a few continuous frames, one may assume the finger has moved away from the screen and stops the tracking. The finger location is used to update the state of the tracked finger. The updated state is used to predict finger location in next frame.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A display comprising:
   (a) a display area that emits light, a liquid crystal layer and a backlight layer;
   (b) a border region surrounding at least a portion of said light emitting region;
   (c) a light guide plate overlaying said display area, said light guide plate positioned at a location on a side of said liquid crystal layer opposite that of said backlight layer;
   (d) at least one lighting module operatively interconnected with said light guide plate to provide light to said light guide plate and positioned within said border region;
   (e) at least one camera module operatively interconnected with said light guide plate to sense light from said light guide plate, said at least one camera module supported by said light guide plate, said at least one camera module positioned at a location on a side of said liquid crystal layer opposite that of said backlight layer, and said at least one camera module positioned within said border region; where
   (f) said display receives a measured angle of a touch on said light guide plate by sensing frustrated total internal reflection within said light guide plate as a result of a true angle of said touch on said light guide plate, said true angle different than said measured angle, where said display determines said true angle using said measured angle.

2. The display of claim 1 wherein said display determines said true angle using said measured angle and calibration data.

3. The display of claim 2 where the calibration data is stored in a lookup table.

4. The display of claim 1 wherein said camera modules include a two-dimensional sensor and wherein said camera modules are located in said border region.

5. The display of claim 4 wherein said at least one of said camera modules and said at least one lighting module are positioned along the same edge of said border region.

6. The display of claim 4 wherein said at least one of said camera modules and said at least one lighting module are positioned along different edges of said border region.

7. The display of claim 4 wherein said at least one of said camera modules and said at least one lighting module are positioned along a plurality of edges of said border region.

8. The display of claim 2 where said calibration data is collected using input from a user.

9. The display of claim 2 wherein said display determines said true angle by converting a fan region into a rectangle image.

10. The display of claim 1 where said display determines a plurality of positions of a plurality of touches on said light guide plate by determining a plurality of locations of frustrated total internal reflections within said light guide plate as a result of said plurality of touches on said light guide plate.

11. The display of claim 9 wherein said rectangle image is compressed into a 1-D array so as to increase a signal-to-noise ratio.

12. The display of claim 1 wherein said display determines a position of injected light into said light guide plate by determining a location of said injected light within said light guide plate as a result of selectively injecting light into said light guide plate.

13. The display of claim 12 wherein said display determines a plurality of positions of injected lights into said light guide plate by determining locations of said injected lights within said light guide plate as a result of selectively injecting lights into said light guide plate.

14. The display of claim 12 wherein said injected light has a different range of wavelengths than said light from said at least one lighting module.

15. The display of claim 11 where signal detections on the 1-D array are converted to a ray on the display using the calibration data.

16. The display of claim 1 wherein said display receives a plurality of measured touches on said display and removes ghost touches using a Kalman filter.

17. The display of claim 16 wherein said display removes said ghost touches by determining candidate positions of touches and using a plurality of cameras to vote on said candidate positions.

18. The display of claim 11 wherein said display determines said true angle using a background statistical model and a matched filter applied to the 1-D array.

19. The display of claim 18 where the background statistical model is based on a plurality of frames captured without touches on the screen.

20. The display of claim 19 where said background statistical model is used to determine a mean and standard deviation, each used to calculate a respective thresholds applied to each point in the 1-D array when applying the matched filter to the 1-D array.

* * * * *